(12) United States Patent
Fraidlin et al.

(10) Patent No.: US 6,377,476 B1
(45) Date of Patent: Apr. 23, 2002

(54) PROTECTION CIRCUIT FOR ACTIVE SWITCHES IN CLAMP-MODE TOPOLOGIES, AND POWER CONVERTER EMPLOYING THE SAME

(76) Inventors: Simon Fraidlin, 4512 Chesterwood Dr., Plano, TX (US) 75093; Mark Elliott Jacobs, 7615 Applecross La., Dallas, TX (US) 75248; Allen Frank Rozman, 1702 Waverly Ct., Richardson, TX (US) 75082; Vijayan Joseph Thottuvelil, 3328 Russell Cir., Plano, TX (US) 75023

( * ) Notice: Subject to any disclaimer, the term of this patent is extended or adjusted under 35 U.S.C. 154(b) by 0 days.

(21) Appl. No.: 09/543,022

(22) Filed: Apr. 4, 2000

Related U.S. Application Data

(63) Continuation of application No. 08/936,955, filed on Sep. 25, 1997, now abandoned.

(51) Int. Cl.[7] .............................................. H02M 3/335
(52) U.S. Cl. ........................................................ 363/20
(58) Field of Search ............................. 363/16, 20, 21, 363/95, 97, 131

(56) References Cited

U.S. PATENT DOCUMENTS

| | | | | |
|---|---|---|---|---|
| 5,303,138 A | * | 4/1994 | Rozman | 363/21 |
| 5,327,333 A | * | 7/1994 | Boylan et al. | 363/21 |
| 5,636,107 A | * | 6/1997 | Lu et al. | 363/20 |
| 5,663,876 A | * | 9/1997 | Newton et al. | 363/126 |
| 5,734,563 A | * | 3/1998 | Shinada | 363/21 |
| 5,872,705 A | * | 2/1999 | Loftus, Jr et al. | 363/21 |
| 5,973,939 A | * | 10/1999 | Tan | 363/21 |
| 6,055,782 A | * | 12/1999 | Jain et al. | 363/21 |
| 6,061,253 A | * | 5/2000 | Igarashi et al. | 363/19 |

* cited by examiner

*Primary Examiner*—Matthew Nguyen

(57) ABSTRACT

An impedance network for passive shoot-through protection of active switches in clamp-mode topologies. In one exemplary embodiment a switch-mode converter, includes: a primary switch; an auxiliary switch coupled in series with a capacitor; and an impedance network, coupled to the primary switch and the auxiliary switch; configured to limit current during simultaneous conduction of the primary and auxiliary switches. The impedance network includes a resistor coupled in series to a diode and both in parallel with an inductor. The impedance network permits the design of a clamp-mode converter without the need for a delay between switch turn-off and turn-on of primary and auxiliary switches.

8 Claims, 2 Drawing Sheets

PROTECTION CIRCUIT FOR ACTIVE SWITCHES IN CLAMP-MODE TOPOLOGIES, AND POWER CONVERTER EMPLOYING THE SAME

This is a continuation of prior application Ser. No. 08/936,955, filed on Sep. 25, 1997, now abandoned entitled "Protection Circuit for Active Switches in Clamp-Mode Topologies, and Power Converter Employing the Same."

BACKGROUND OF THE INVENTION

1. Field of the Invention

The present invention relates generally to switch-mode power conversion, and more specifically, to a passive shoot-through protection circuit for active switches in clamp-mode topologies.

2. Related Art

Switch-mode power converters are widely used in power processing applications to convert an input voltage or current source into a specified output voltage or current. A basic topology configuration employed in many switch-mode converters is a clamp-mode topology, which generally includes at least one type of clamping device (also referred to as an "active clamp," a "Carsten clamp," or a "Polykarpov clamp"). The clamping device, in particular, is typically a switching device (auxiliary switch) connected in series with a capacitor. Generally, the clamping device transfers or recycles stored energy from the capacitor to a transformer(s) winding(s) during a converter's off period. For example, at a time after a primary switch of the converter is inactive (off period), the auxiliary switch is turned-on (activated), thus transferring any stored energy between the clamping device's capacitor and the transformer(s) winding(s).

A primary requirement in most clamp-mode topologies is that there be no overlap between the primary switch and the auxiliary switch, because even a brief overlap of conduction period of the two switches, (typically on the same side of the transformer), can result in substantial shoot-through currents (short circuits) and cause catastrophic circuit damage, such as a burned out switch. As a result designers have been required to include delays between the turn-off of one switch, and turn-on of the other, see, i.e., U.S. Pat. No. 4,441,146, issued Apr. 3, 1984 to Vinciarelli, (the '146 patent) (requirement to avoid an overlap between switches) and U.S. Pat. No. 5,331,533, issued Jul. 19, 1994, to Smith (the '533 patent) both incorporated herein in their entirety.

Sometimes when the delay between the auxiliary switch and the primary switch is designed to a minimum, however, inadvertent simultaneous conduction of both switches can occur due to operational corruption and/or converter imperfections, such as, manufacturing variances between component values of the converter. These variances can create brief timing irregularities and can cause an overlap of conduction between the primary and auxiliary switches. Ensuring that there is a large enough delay through testing and design is costly and increases circuit complexity of converters.

Therefore, what is needed is a way to protect constituent components of a clamp-mode converter when there is simultaneous conduction of the primary switch and the clamping switch.

SUMMARY OF THE INVENTION

The present invention is directed to an impedance network for passive shoot-through protection of active switches in clamp-mode topologies. In one exemplary embodiment a switch-mode converter, includes: a primary switch; an auxiliary switch coupled in series with a capacitor; and an impedance network, coupled to the primary switch and the auxiliary switch; configured to limit current during simultaneous conduction of the primary and auxiliary switches.

DETAILED DESCRIPTION OF THE INVENTION

Figure 1:
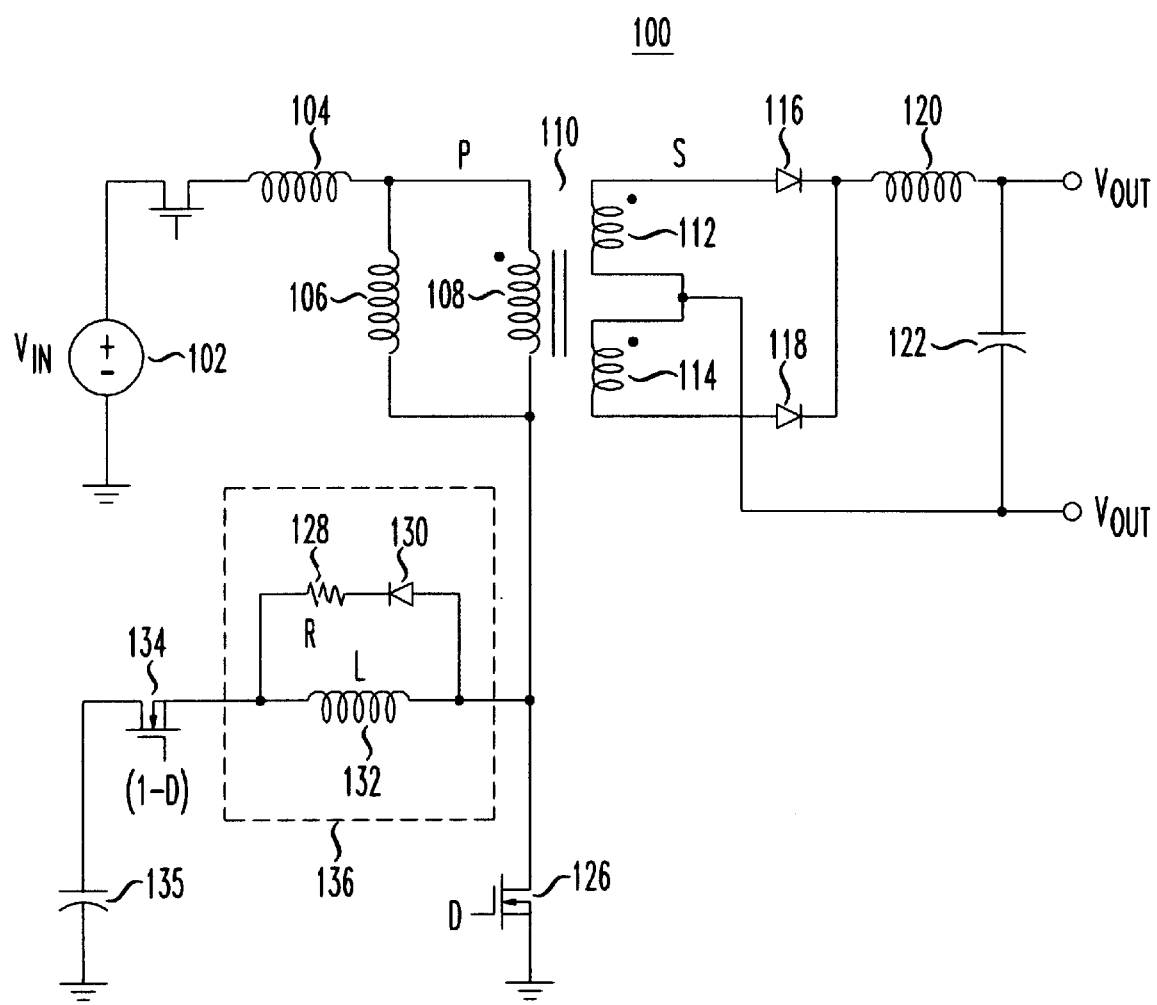
FIG. 1 is a schematic diagram of a typical clamp-mode push-push converter, constructed according to the principles of the present invention.

FIG. 1 is a schematic diagram of a typical clamp-mode push-push converter 100, constructed according to the principles of the present invention. Such a converter is described in more detail in U.S. Pat. No. 5,282,123, entitled Clamped Mode DC—DC converter, issued Feb. 6, 1996 to Boylan et al., and commonly assigned with the present application to Lucent Technologies, Inc., Murray Hill, N.J., USA. The converter 100 includes an input voltage source 102 coupled to a transformer 110 (including a primary winding 108, first and second secondary windings 112, 114, and two sample parasitic inductances 104, 106) having a primary and secondary side P/S. First and second rectifying diodes 116, 118, are coupled to the first and second secondary windings 112, 114, of the transformer 110. The first and second rectifying diodes 116, 1 18 are also coupled to an output filter inductor 120 that is coupled to an output capacitor 122. Output terminals $V_{OUT}$, are for receiving a load (not shown).

Also shown in FIG. 1, is a primary switch 126 of converter 100 and a clamping circuit including an auxiliary switch 134 in series with a capacitor 135. Coupled in series with the auxiliary switch 134 is an impedance network 136. In the illustrated embodiment, the impedance network 136 is a circuit including: a diode 130, a resistor 128, and an inductor 132. The diode 130 is in series with a resistor 128 and both are in parallel with the inductor 132. While specific elements 128, 130 and 132 are shown in this embodiment, all that is required is a device that exhibits impedance characteristics that can function in conjunction with a clamp-mode converter. It is preferred that the device be passive in nature. Additionally, it is possible that the impedance network 136 may be inserted between the primary winding 108 of transformer 110 and the primary switch 126. It is also appreciated that the impedance network 136 can be used in a clamp converter where the clamping circuit 134, 135 is on the secondary side of a transformer or in connection with an auxiliary winding as would be readily appreciated by those skilled in the relevant art. The following U.S. patents describe various topologies and the operation of a clamp-mode converter,: U.S. Pat. No. 4,441,146 to Vinciarelli, issued Apr. 3, 1984; and U.S. Pat. No. 5,331,533 to Smith, issued Jul. 19, 1994, both incorporated herein in their entirety by reference.

The impedance network 136 is necessary for reliable circuit operation to prevent the capacitor 135 from discharging rapidly through switches 134 and 126, if both are turned-on simultaneously. The device 136 prevents shoot-through generally as follows: A voltage on capacitor 135 is typically higher than the input voltage $V_{IN}$ 102. If both switches 126, 134 are momentarily on at the same time, the diode 130 is back-biased and nonconducting, and the inductor 132 serves to limit any shoot-through current by limiting a time derivative of the current to the capacitor 135 voltage divided by the value of the inductor 132. The diode 130 and resistor 128 provide a path for discharging any current that is built-up in the inductor 132 due to simultaneous on-time of the switches 126, 135.

An example may be helpful in appreciating the aforementioned. First, consider a case where the primary switch 126 is conducting, and the auxiliary switch 134 is turned-on momentarily before the primary switch 126 is turned-off. A shoot-through current from the capacitor 135 through switches 126 and 134 is initiated, and builds-up at a rate limited by the inductor 132. When the primary switch 126 is opened, the current in the inductor 132 is transferred to the diode 130 and resistor 128, where the current decays with a time constant expressed as T=L/R. The time constant T is selected to be short compared to a switching cycle. Thus, momentary overlapping conduction of the two switches 126, 134 is accommodated. A similar protection process occurs in the converter 100 when the auxiliary switch 134 is conducting, and the primary switch 126 is turned-on before the auxiliary switch 134 is turned-off.

The energy stored in the inductor 132 is dissipated twice each switching cycle in the resistor 128 due to two possible periods of switch overlap, and the resulting power dissipation, $P_{DISS-R}$, in the resistor 128 be estimated according to equation 1.0:

$$P_{DISS-R} = (V_{CAPACITOR\ 135})^2 * (T_{overlap})^2 f_s/L \qquad (eq.1.0)$$

where $V_{CAPACITOR\ 135}$ is the voltage in the clamp capacitor 135, $T_{overlap}$ is the overlapping time of the two switches 126, 134, and $f_s$ is the switching frequency. For a case where the voltage on the clamp capacitor 135 is 70 volts, the overlapping time is 10 nanoseconds in each transition of the switches 126, 134 (i.e., twice per switching cycle), the switching frequency is 100 kHz, and the inductor 132 (L=50 nanohenries), the resulting power dissipated in the resistor 128 is accordingly 1 watt.

An alternative embodiment, is to provide, with complete certainty, a dead time between the turn-off of one switch and turn-on of the other. Typically, this requires that an RC network be included in the gate drive circuit for each switch to guarantee a delay in the turn-on. However, to minimize switch losses during turn-off, a by-pass mechanism should be included in the circuit so that rapid turn-off of each switch can be provided, resulting in additional components and cost. Typical additional circuit elements may include diodes and gate-driver integrated circuit. By inclusion of an impedance network 136, a designer may choose to have essentially zero time delay between turn-off of one switch and turn-on of the other, and incur neither substantial switching losses nor risk of damaging shoot-through. The finite turn-off and turn-on times of switches, such as FETs may reduce the actual losses in the resistor 128 from the value predicted by equation 1.0, which assumes idealized switches and instantaneous switching.

Figure 2:
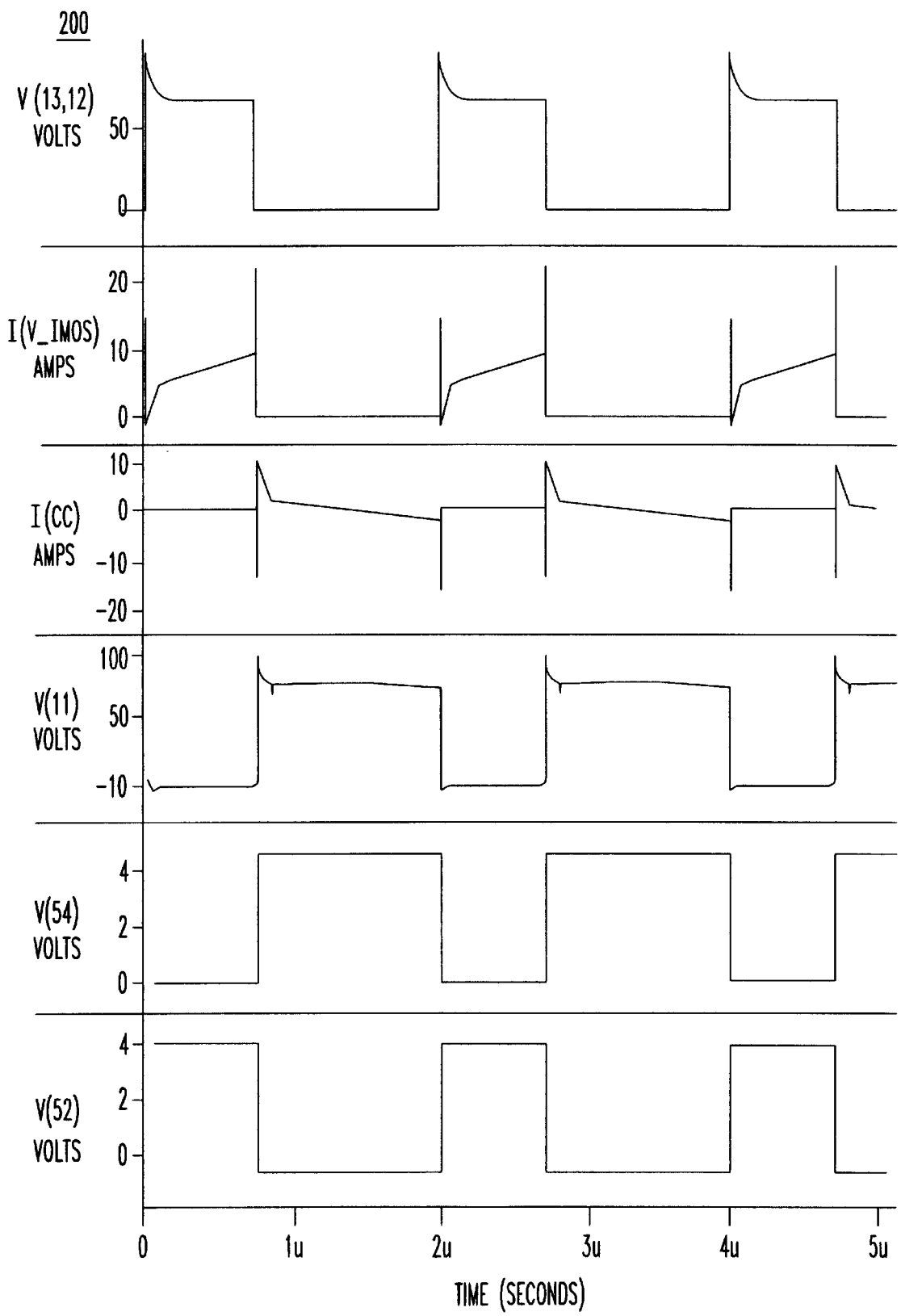
FIG. 2 is graph plot illustrating the operation of an example power supply in accordance with the general principles of the present invention.

FIG. 2 is graph plot 200 illustrating the operation of an example power supply in accordance with the general principles of the present invention. The graphs represent a simulated power of that described in FIG. 1 above, using a SINIPLIS circuit simulator. In this simulation, the power supply delivers an output voltage $V_{OUT}$ of 3.8 volts at a current approximately 22 amperes, or about 80 watts. The clamp capacitor 135 carries 73 volt, the switching frequency is 500 kHz, and the switch overlap time is 10 nanoseconds during each switch transition. The resistor 128 is 1 ohm, and L is 50 nanohenries. The FETs 126, 134 represented by the circuit simulator have finite on-resistance and a small capacitor in parallel with the drain-to-source connection to represent the output capacitance of the FETs. The results of the simulation demonstrate that no potentially damaging currents flow in the circuit.

While exemplary embodiments have been set forth, various modifications, alterations, and changes may be made without departing from the spirit and scope of the present invention as defined in the specification and in the appended claims.

What is claimed is:

1. A switch-mode converter, comprising:

a primary switch;

an auxiliary switch coupled in series with a capacitor; and an impedance network, coupled between said primary switch and said auxiliary switch; configured to limit current during simultaneous conduction of said primary and auxiliary switches.

2. The switch-mode converter of claim 1 further comprising a transformer having a primary side and secondary side, said primary and auxiliary switches, said capacitor and said impedance network being located on said primary side of said transformer.

3. The switch-mode converter of claim 1 further comprising a transformer having a primary side and secondary side, said primary and auxiliary switches, said capacitor and said impedance network being located on said secondary side of said transformer.

4. The switch-mode converter of claim 1 wherein said impedance network comprises impedance circuitry.

5. The switch-mode converter of claim 4 wherein said impedance circuitry, comprises:

a diode;

a resistor coupled in series with said diode; and an inductor coupled in parallel with said diode and said resistor.

6. The switch-mode converter of claim 2 wherein said impedance network is coupled in series between a primary winding of said primary side of said transformer and said primary switch.

7. A power supply, comprising:

(a) a transformer having at least a primary winding and secondary winding;

(b) a primary switch, coupled in series with said primary winding;

(c) an auxiliary switch in parallel with said primary switch; and (d) an impedance network, coupled between said primary switch and said auxiliary switch and in series with said auxiliary switch configured to limit current during simultaneous conduction of said primary and auxiliary switches.

8. The power supply of claim 7 wherein said impedance circuitry, comprises:

a diode;

a resistor coupled in series with said diode; and an inductor coupled in parallel with said diode and said resistor.

* * * * *